United States Patent
Haussmann et al.

(10) Patent No.: US 10,523,099 B2
(45) Date of Patent: Dec. 31, 2019

(54) ROTOR, RELUCTANCE MACHINE AND PRODUCTION METHOD FOR A ROTOR

(71) Applicant: KSB Aktiengesellschaft, Frankenthal (DE)

(72) Inventors: Meike Haussmann, Frankenthal (DE);
Florian Kanoffsky, Frankenthal (DE);
Martin Mueller, Frankenthal (DE);
Timo Muntz, Frankenthal (DE);
Jochen Schaab, Frankenthal (DE);
Boris Janjic, Frankenthal (DE)

(73) Assignee: KSB Aktiengesellschaft, Frankenthal (DE)

( * ) Notice: Subject to any disclaimer, the term of this patent is extended or adjusted under 35 U.S.C. 154(b) by 481 days.

(21) Appl. No.: 14/765,544

(22) PCT Filed: Jan. 31, 2014

(86) PCT No.: PCT/EP2014/051901
§ 371 (c)(1),
(2) Date: Aug. 3, 2015

(87) PCT Pub. No.: WO2014/118321
PCT Pub. Date: Aug. 7, 2014

(65) Prior Publication Data
US 2015/0372577 A1    Dec. 24, 2015

(30) Foreign Application Priority Data
Feb. 1, 2013   (DE) .................. 10 2013 201 694

(51) Int. Cl.
*H02K 17/00*    (2006.01)
*H02K 19/14*    (2006.01)
(Continued)

(52) U.S. Cl.
CPC ............ *H02K 19/14* (2013.01); *H02K 1/246* (2013.01); *H02K 15/0012* (2013.01); *H02K 15/12* (2013.01); *Y10T 29/49014* (2015.01)

(58) Field of Classification Search
CPC .... H02K 19/14; H02K 1/246; H02K 15/0012; H02K 15/12; Y10T 29/49014
(Continued)

(56) References Cited

U.S. PATENT DOCUMENTS

| 5,818,140 A | 10/1998 | Vagati |
| 7,112,908 B2 | 9/2006 | Takita et al. |

(Continued)

FOREIGN PATENT DOCUMENTS

| CN | 1250553 A | 4/2000 |
| CN | 1726629 A | 1/2006 |

(Continued)

OTHER PUBLICATIONS

German-language Examination Report dated Dec. 11, 2013 (eight (8) pages).

(Continued)

*Primary Examiner* — Jianchun Qin
(74) *Attorney, Agent, or Firm* — Crowell & Moring LLP

(57) ABSTRACT

A rotor for a reluctance machine is provided. The rotor includes a cylindrical soft-magnetic element having cutouts for forming magnetic flux barriers. Some or all of the flux barriers are divided by one or more webs, with the profile of the individual webs forming a closed line which divides the rotor in the radial direction into an inner and an outer region. The cut-outs may be partially or fully filled with a a paramagnetic or diamagnetic filler material.

16 Claims, 6 Drawing Sheets

(51) Int. Cl.
*H02K 1/24* (2006.01)
*H02K 15/00* (2006.01)
*H02K 15/12* (2006.01)

(58) Field of Classification Search
USPC .......................................................... 310/211
See application file for complete search history.

(56) References Cited

U.S. PATENT DOCUMENTS

| | | | | |
|---|---|---|---|---|
| 7,851,960 | B2* | 12/2010 | Lee | H02K 1/246 310/156.53 |
| 9,705,388 | B2* | 7/2017 | Melfi | H02K 21/46 |
| 2003/0173861 | A1* | 9/2003 | Kawaguchi | H02K 1/246 310/61 |
| 2003/0184185 | A1 | 10/2003 | Yoshino et al. | |
| 2006/0108888 | A1 | 5/2006 | Jung et al. | |
| 2006/0284507 | A1* | 12/2006 | Murakami | H02K 1/2793 310/156.37 |
| 2010/0011806 | A1* | 1/2010 | Nam | F04C 18/3564 62/510 |
| 2011/0316380 | A1 | 12/2011 | Buettner et al. | |

FOREIGN PATENT DOCUMENTS

| | | |
|---|---|---|
| DE | 10 2005 062 922 A1 | 7/2007 |
| DE | 10 2009 008 440 B3 | 12/2010 |
| JP | 2000-197325 A | 7/2000 |
| JP | 2001-238418 A | 8/2001 |
| JP | 2002-95227 A | 3/2002 |
| JP | 2003-125567 A | 4/2003 |
| JP | 2006-121765 A | 5/2006 |
| WO | WO 98/40952 A1 | 9/1998 |

OTHER PUBLICATIONS

International Search Report (PCT/ISA/210) dated May 11, 2015 with English-language translation (seven (7) pages).
German-language Written Opinion (PCT/ISA/237) dated May 11, 2015 (nine (9) pages).
International Preliminary Report on Patentability (PCT/IB/373) issued in PCT Application No. PCT/EP2014/051901 dated Aug. 4, 2015, including English-translation of document C3 (German-language Written Opinion (PCT/ISA/237)) previously filed on Aug. 3, 2015 (thirteen (13) pages).
English Translation of Chinese Office Action, including Search Report issued in counterpart Chinese Application No. 201480007005.5 dated Mar. 26, 2019 (eight (8) pages).

* cited by examiner

ROTOR, RELUCTANCE MACHINE AND PRODUCTION METHOD FOR A ROTOR

CROSS REFERENCE TO RELATED APPLICATIONS

This application is a continuation of PCT International Application No. PCT/EP2014/051901, filed Jan. 31, 2014, which claims priority under 35 U.S.C. § 119 from German Patent Application No. 10 2013 201 694.8, filed Feb. 1, 2013, the entire disclosures of which are herein expressly incorporated by reference.

BACKGROUND AND SUMMARY OF THE INVENTION

The invention relates to a rotor for a reluctance machine comprising a cylindrical soft-magnetic element, wherein the soft-magnetic element has cutouts for forming magnetic flux barriers.

Rotors for synchronous reluctance machines are usually equipped with a cylindrical soft-magnetic element, which is arranged coaxially on the rotor axis. In order to form at least one pole pair or gap pair, the soft-magnetic element comprises flux-conducting and flux-blocking portions, which differ from one another by a magnetic permeability of differing degree. The portion with high magnetic conductivity is characterized as is known as the d-axis of the rotor, and the portion with comparatively lower conductivity is characterized as the q-axis of the rotor. An optimal degree of efficacy of the reluctance motor and therefore an optimal torque yield is then provided when the d-axis has the greatest possible magnetic conductivity and the q-axis has the lowest possible conductivity.

This precondition is often met by the formation of a plurality of cutouts filled with air in the soft-magnetic element along the q-axis, whereby the magnetic flux in the direction of the q-axis is inhibited and as a result the permeability decreases. The soft-magnetic element constructed in this way is then mounted on a rotor shaft and fixed axially and also tangentially.

For stability reasons one or more flux barriers is/are divided into two by radially oriented inner webs. The web arrangement increases the strength of the laminated core, which in particular optimizes the rotor stability during operation. The width of the webs is low in order to keep the influence on the permeability as low as possible.

Synchronous reluctance motors are regularly fed via a frequency converter, whereby the rotational speed can rise from 0 to operating speed and can be adjusted during operation. In particular the rotational speed for starting the motor can be increased in steps. If the synchronous reluctance motor by contrast is operated in a fixed grid, the use of a starting cage is necessary in order enable asynchronous starting. As soon as the rotational speed of the rotor approaches the synchronous rotational speed, the reluctance torque becomes predominant and the rotor runs synchronously with the rotating field.

The structure of the starting cage corresponds to the embodiments in the case of standard asynchronous machines. The cage consists of individual conductor bars, which are short-circuited at the end face. The starting cage is secured to the rotor via additional cutouts in the rotor laminated core. The structure and also the production of a rotor of this type however are comparatively complex.

The object of the present invention is to further develop a rotor for a reluctance machine in such a way that the above-mentioned disadvantages are overcome.

This object is achieved by a rotor for a reluctance machine that comprises a cylindrical soft-magnetic element, which has one or more cutouts for forming magnetic flux barriers.

In a preferred embodiment of the rotor according to the invention the soft-magnetic element is embodied as a laminated core, which, as known from the prior art, is constructed from a plurality of laminations stacked one above the other in the axial direction of the rotor and insulated from one another. This design prevents the occurrence of eddy currents in the soft-magnetic element.

In accordance with the invention all or some of the flux barriers are divided by one or more webs. The arrangement of the webs on the one hand has the purpose of providing the rotor with additional stability, in particular in the radial direction. On the other hand the rotor is divided in accordance with the invention into an inner and outer rotor region. The course of the individual webs forms a closed line, which divides the rotor in the radial direction into an inner and an outer rotor region.

The arranged flux barriers ideally do not have a trans-regional course, i.e. none of the flux barriers crosses the boundary line between inner and outer rotor region. The prohibition of the trans-regional course is based on cohesive flux barrier segments. By contrast a flux barrier divided by a web can be arranged in a trans-regional manner.

The separation of the rotor into an inner and outer region influences and optimizes the starting behavior of the rotor. When using the rotor in a reluctance machine it is possible to dispense with the use of a frequency converter, i.e. the rotor construction according to the invention allows asynchronous rotor starting when a three-phase current with constant frequency is applied.

In particular, the embodiment of the outer rotor region is used for the generation of a type of starting cage, of which the effect corresponds substantially to that of a starting cage for standard asynchronous machines. Additional provisions that were previously necessary for rotors of this type for providing the starting cage are unnecessary.

The production, manufacture and operation of the rotor according to the invention are noticeably simplified. In particular at least one conductor bar of a starting cage can be replicated by the outer rotor region. In accordance with the invention the parts of the flux barriers located in the outer rotor region form parts of the starting cage. In accordance with the invention each part of the starting cage replicated in this way is part of a flux barrier, with the exception of the short-circuit rings, which are not part of the rotor active part.

By means of the rotor lamination section according to the invention it is therefore possible to produce, with use of identical rotor laminations depending on the application, both a synchronous reluctance machine with starting cage starting at the fixed grid and also a synchronous reluctance machine without starting cage and operated by frequency converter.

In an advantageous embodiment the webs are not oriented or are only partially oriented in the radial direction. The rotor regions can be divided arbitrarily by suitable orientation of the webs.

In particular the form or the specific course of the web guidance is variable. A circular course of the web guidance is expedient, such that an annular inner and/or outer region is/are produced.

An alternative web guidance, in which a rectangular or quadrangular inner rotor region is produced, is also conceivable. The outer rotor region is formed by the external rotor faces. In addition it is possible for the inner region to approach or border the outer periphery of the rotor in portions. The inner rotor region ideally has a substantially circle-like form, which in portions, in particular in the region of the q-axis, borders the outer periphery of the rotor.

The rotor advantageously has an even number of poles, in particular two, four, six or eight poles. The arrangement of the individual flux barriers corresponds substantially to the technical teaching of US patent specification U.S. Pat. No. 5,818,140, to which reference is made expressly in this regard. The rotor of U.S. Pat. No. 5,818,140 has, similarly to the rotor of the invention, merely flux barriers as electromagnetically effective elements, which flux barriers may also be filled wholly or partially with permanent magnets. In any case such a rotor has a pure flux barrier section without any additional electromagnetically effective elements. These flux barriers each extend substantially arcuately and symmetrically with respect to the q-axis of a pole segment of the rotor. Compared to the technical teaching disclosed in U.S. Pat. No. 5,818,140, the subject matter according to the invention differs however by the web guidance according to the invention, which divides the rotor into an outer and inner rotor region.

One or more flux barriers can be filled at least in part with a paramagnetic or diamagnetic filler material. The filling of the individual flux barriers with air was previously conventional. Improved rotor properties are provided however when one or more flux barriers are filled with suitable materials that have better paramagnetic or diamagnetic properties compared with air.

Suitable materials include, for example, a metal oxide and/or aluminum and/or an aluminum alloy and/or copper and/or a copper alloy and/or plastic and/or ceramic and/or a textile and/or wood. A mixture of two or more of the specified components is also conceivable.

Both rotor regions, i.e. the flux barriers of both rotor regions, are ideally filled with appropriate filler materials. However, reference is made to the fact that this is not a necessary condition for the use of the rotor according to the invention. It is also conceivable for just the inner or just the outer region to be filled with a corresponding filler material.

The two rotor regions do not necessarily have to be filled with the same filler substance. One or more flux barriers of the outer rotor region is/are particularly preferably filled with aluminum or a filler material containing aluminum alloy. A filling of this type of the outer flux barriers has sufficient conductivity, such that the conventional conductor bars of a starting cage are replicated.

In particular, one or more flux barriers of the outer rotor region is/are filled here with an electrically conductive and magnetically non-conductive filler material, in particular with aluminum or a filler material containing aluminum alloy, and at least one flux barrier, preferably a plurality of the flux barriers, ideally all flux barriers, of the inner rotor region is/are not filled with this filler material. Here, one or more flux barriers of the inner rotor region may not be filled at all, i.e. may contain air, or may be filled with another filler material, in particular with an electrically and magnetically non-conductive filler material, such as plastic, ceramic, textiles or wood and any mixtures thereof.

In accordance with a further embodiment one or more flux barriers of the inner rotor region is/are filled wholly or partially with permanent-magnetic material. The efficacy and the power factor of the electric machine are thus improved.

The filler materials can be introduced as solid material, which is inserted into the corresponding cutouts in the rotor laminated core. Alternatively one or more flux barriers can be filled by casting methods, in particular injection molding methods.

The invention also relates to a reluctance machine, in particular a synchronous reluctance machine, having at least one rotor according to the present invention or an advantageous embodiment of the present invention. The advantages and properties of the reluctance machine according to the invention clearly correspond to those of the rotor according to the invention or those of one of the advantageous embodiments of the rotor according to the invention. For this reason a repeated description is spared.

The properties of the rotor according to the invention now mean that the reluctance machine can also be operated without frequency converter on a fixed three-phase network. The embodiment of the outer rotor region serves for the construction of a starting cage, such that the rotor can be started and set in a synchronous rotational movement without frequency converter. By way of example, one or more conductor rods is/are replicated via the outer rotor region according to the invention, wherein the outer rotor region, in combination with short-circuit rings arranged on the end face of the rotor, forms a starting cage.

The invention also relates to a method for producing a rotor according to the present invention or an advantageous embodiment of the invention. In accordance with the invention at least some of the flux barriers in the rotor core are filled at least in part with a paramagnetic and/or diamagnetic medium by casting. The rotor to be produced has an inner and outer rotor region.

Furthermore, in accordance with the invention the rotor region not to be filled is acted on by an axial force. As a result, an infiltration of the filling medium into the flux barriers of the rotor region not to be filled is prevented by the filling of the flux barriers of the rotor region to be filled. By way of example the flux barriers of the outer rotor region are to be filled with a paramagnetic or diamagnetic medium. In this case an axial force, i.e. a force in the direction of the rotor axis of rotation, is applied to the inner rotor region, such that a cast-in material cannot pass into the flux barriers of the inner rotor region.

The axial force can be applied alternately to the inner and outer rotor region in order to enable a filling of the flux barriers with different materials.

A suitable clamping tool is preferably used to apply the axial force and acts on the end faces of the cylindrical rotor design from one side or both sides. The bearing surface of the clamping tool ideally corresponds approximately or exactly to the geometric dimensioning of the rotor region not to be filled.

If different filler materials are to be introduced into the flux barriers of the inner and outer rotor region, different clamping tools are preferably available, which can each apply an axial force to the inner and then to the outer rotor region. The bearing surfaces of the clamping tools correspond ideally to the geometric dimensioning of the inner and outer rotor region.

Other objects, advantages and novel features of the present invention will become apparent from the following detailed description of one or more preferred embodiments when considered in conjunction with the accompanying drawings.

DETAILED DESCRIPTION

Figure 1:
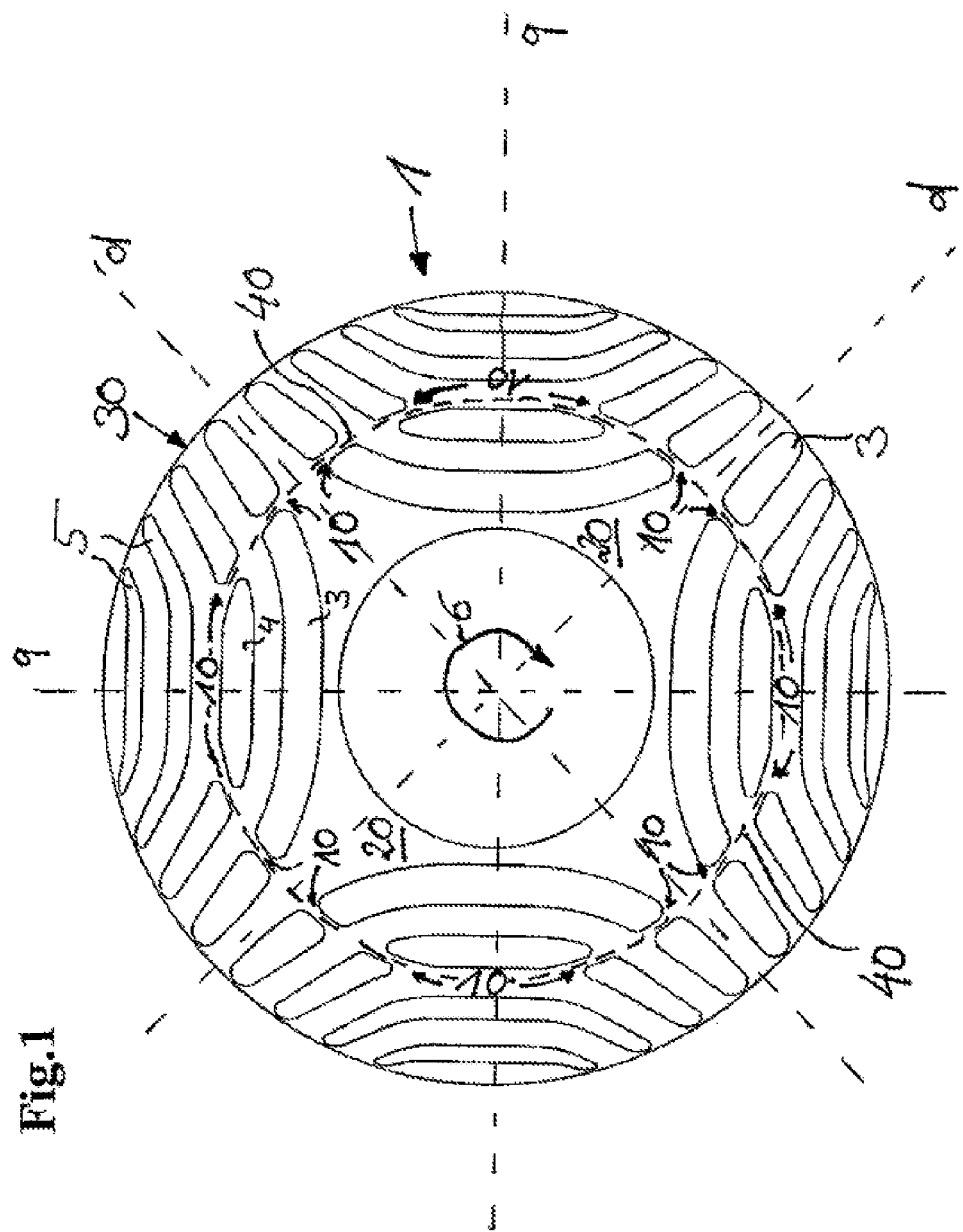
FIG. 1 shows a rotor lamination for the rotor according to the invention in a first embodiment.
Figure 2:
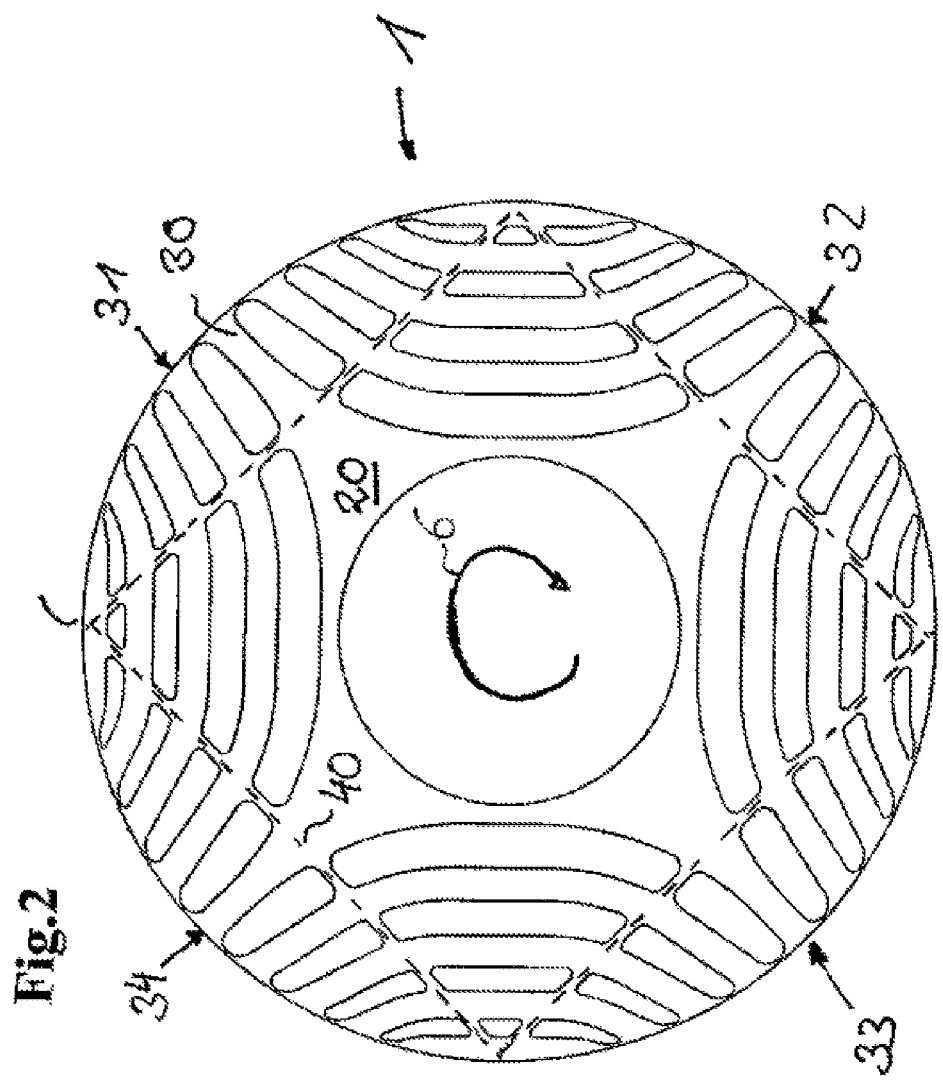
FIG. 2 shows a rotor lamination for the rotor according to the invention in accordance with a second embodiment.
Figure 3:
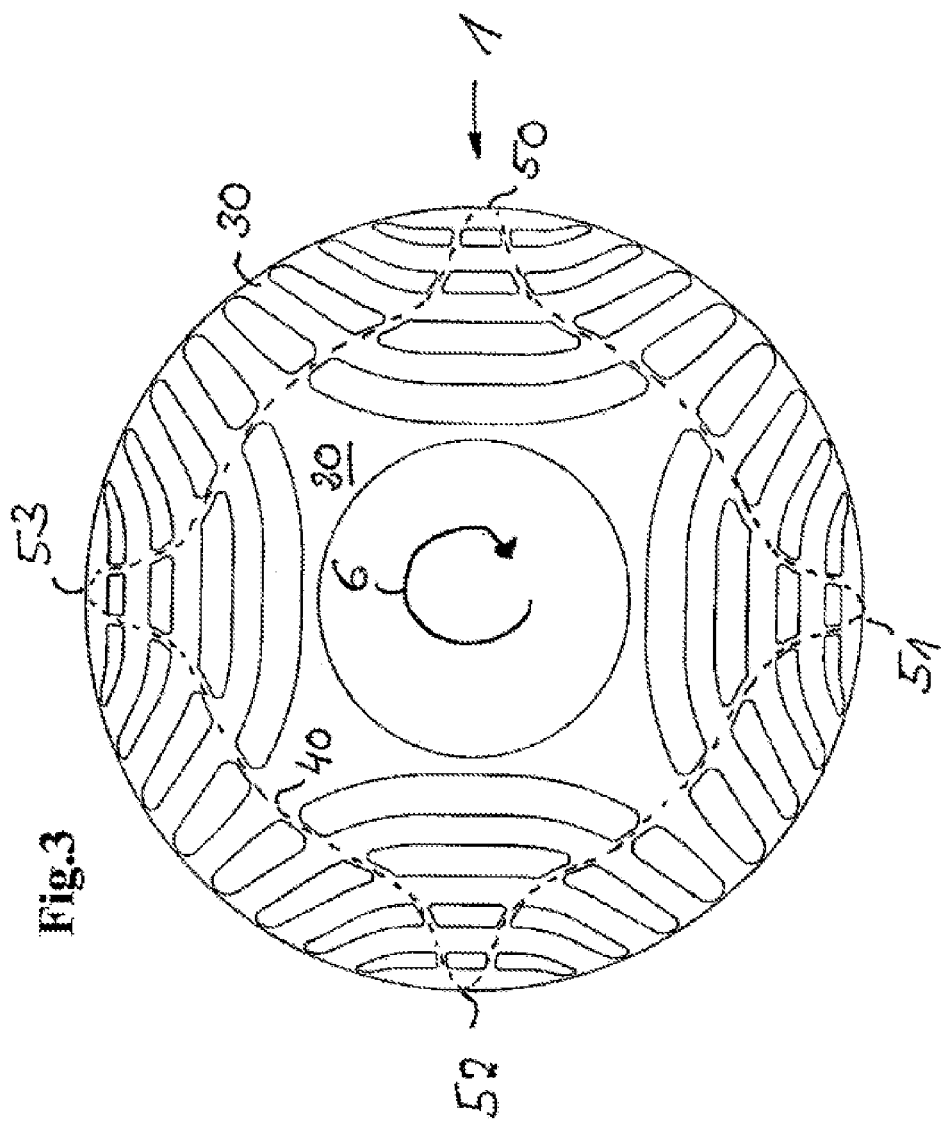
FIG. 3 shows a rotor lamination of the rotor according to the invention in accordance with a further embodiment.

FIGS. 1 to 3 show a plan view of different rotor laminations 1, which are stacked one above the other in an axial direction, i.e. along the axis of rotation 6, for the construction of a rotor according to the invention. In order to simplify the illustration, the stator is not shown. The rotor lamination 1 has a plurality of cutouts 3, 4, 5, which take on the function of flux barriers and the arrangement of which forms a four-pole rotor, of which the magnetic flux is inhibited in the regions with the flux barriers 3, 4, 5. The region with high magnetic conductivity is generally characterized as the d-axis, and the region of low magnetic conductivity is generally characterized as the q-axis.

The assembled laminated core is mounted on a rotor shaft (not illustrated).

The arrangement of the individual flux barriers 3, 4, 5 corresponds substantially to the technical teaching of US patent specification U.S. Pat. No. 5,818,140, to which reference is made expressly in this regard. The rotor construction according to the invention differs from this technical teaching however in the arrangement of the individual webs 10, by means of which the individual flux barriers 3, 4, 5 are divided into different portions. It is characterizing that in each case the two inner flux barriers 3, 4 of each sector of the circle are divided in each case by two webs 10. The number of inner flux barriers, however, is not limited to two. The invention will also include embodiments that have more or fewer flux barriers in the inner region. The two outer flux barriers 5 do not have a web.

The arrangement of the individual webs 10 not only ensures an improved core stability during rotor operation, but also divides the rotor lamination 1 into an inner partial region 20 and an outer partial region 30. In order to illustrate the region division, the circular dashed line 40 is shown, which represents the course of the boundary between the inner and outer rotor region 20, 30. An inner rotor ring 20 and an outer rotor ring 30 are consequently produced by the circular course of the individual webs 10.

The geometry of the outer magnetic flux barriers 5 inclusive of the inner webs 10, together with two short-circuit rings (not shown), which can be arranged at the end face, forms a starting cage. These short-circuit rings can adopted for example in unchanged form from the starting cage of an asynchronous machine.

Additional provisions for a starting cage, such as the metal bars often inserted, can now be omitted.

The two separate regions 20, 30 of the lamination 1 created by the webs 10 arranged in this way can each be filled with a filler material. The use of a uniform filler substance for the flux barriers of both regions 20, 30 is not necessary. Rather, the use of different filler materials lends itself to be able to selectively optimize the running properties of the rotor.

Metal oxides, aluminum, aluminum alloys, copper, copper alloys, plastic, ceramic, textiles, wood and any mixtures thereof can be specified as suitable material. However, all types of paramagnetic or diamagnetic substances are suitable in principle.

Aluminum or an aluminum alloy is optimally introduced into the flux barriers 5 of the outer region 30. Due to the good electrical conductivity, individual conductor bars for forming a starting cage can therefore be replicated. These flux barriers 5 of the outer rotor region 30 forming the conductor bars are short-circuited by short-circuit rings arranged on the end face of the rotor.

These filler materials can be introduced into the flux barriers 3, 4 and 5 in different ways. One possibility is the introduction by casting. Of course, the filler materials can also be inserted as solid material into the cutouts 3, 4, 5.

When filling the filler material by casting an axial force is applied to the rotor lamination 1, whereby the rotor region not to be filled is compressed. The filler material cast into the flux barriers of the rotor region to be filled therefore cannot infiltrate the flux barriers of the rotor region not to be filled.

A suitable filler material selection for the outer region 30 of the rotor lamination 1 optimizes the starting behavior of the synchronous reluctance motor. The motor can ideally be operated without a frequency converter, since the outer region 30 acts as a type of starting cage, of which the mode of action is comparable to the function of a known starting cage for a three-phase asynchronous machine.

In order to apply the axial force to the rotor core, a clamping tool is used, which has a geometry adapted to the web guidance, for example a circular or a square plate, which is brought into contact with the rotor end face. The geometric adaptation ensures an optimal engagement surface of the clamping tool in order to introduce the desired axial force onto the rotor face not to be filled. Ideally, the clamping tool should utilize the complete region of the lamination 1 provided for this in order to avoid stress peaks and resultant deformations.

Alternative embodiments of the rotor lamination 1 can be inferred from FIGS. 2 and 3. FIG. 2 shows a square web guidance, whereby a square inner rotor region 20 is formed. The outer rotor region 30 is formed by individual small circle segments 31, 32, 33 and 34, which are interconnected via the corners of the square rotor region 20. The dashed lines 40 characterize the course of the boundary between the rotor regions 20, 30.

FIG. 3 shows a further alternative, wherein the web guidance forms a substantially circular inner rotor region 20, which protrudes in individual circle portions as far as the outer periphery of the rotor. The dashed lines 40 again characterize the course of the boundary between the rotor regions 20, 30. As can be seen in FIG. 3, the web guidance at the points 50, 51, 52 and 53 deviates from the usual circle shape and extends as far as the outer periphery of the rotor lamination 1.

In addition, all flux barriers in the exemplary embodiments of FIGS. 2 and 3 are divided in each case by two webs into three flux barrier segments.

Figure 4:
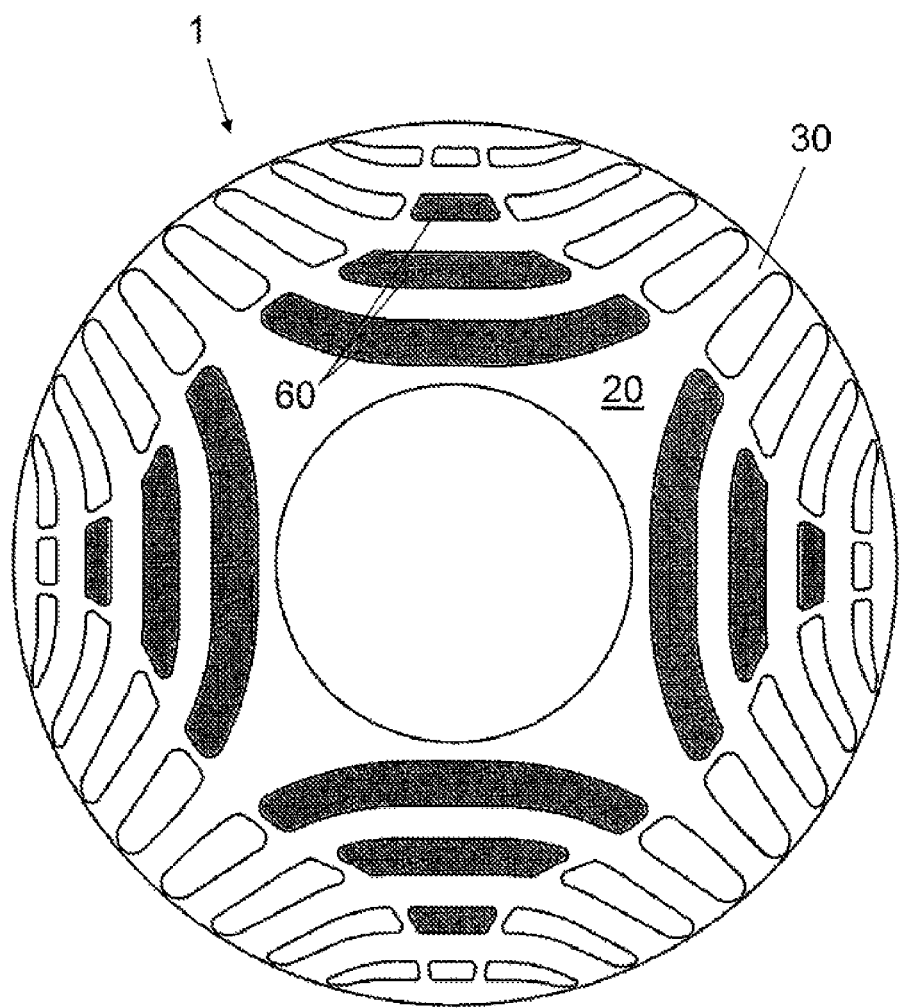
FIGS. 4 and 5 show rotor laminations of the rotor according to the invention in accordance with further embodiments with permanent magnets.

FIG. 4 shows a rotor lamination 1, in which some of the inner flux barriers are filled with permanent magnets or permanent-magnetic filler material 60.

Figure 5:
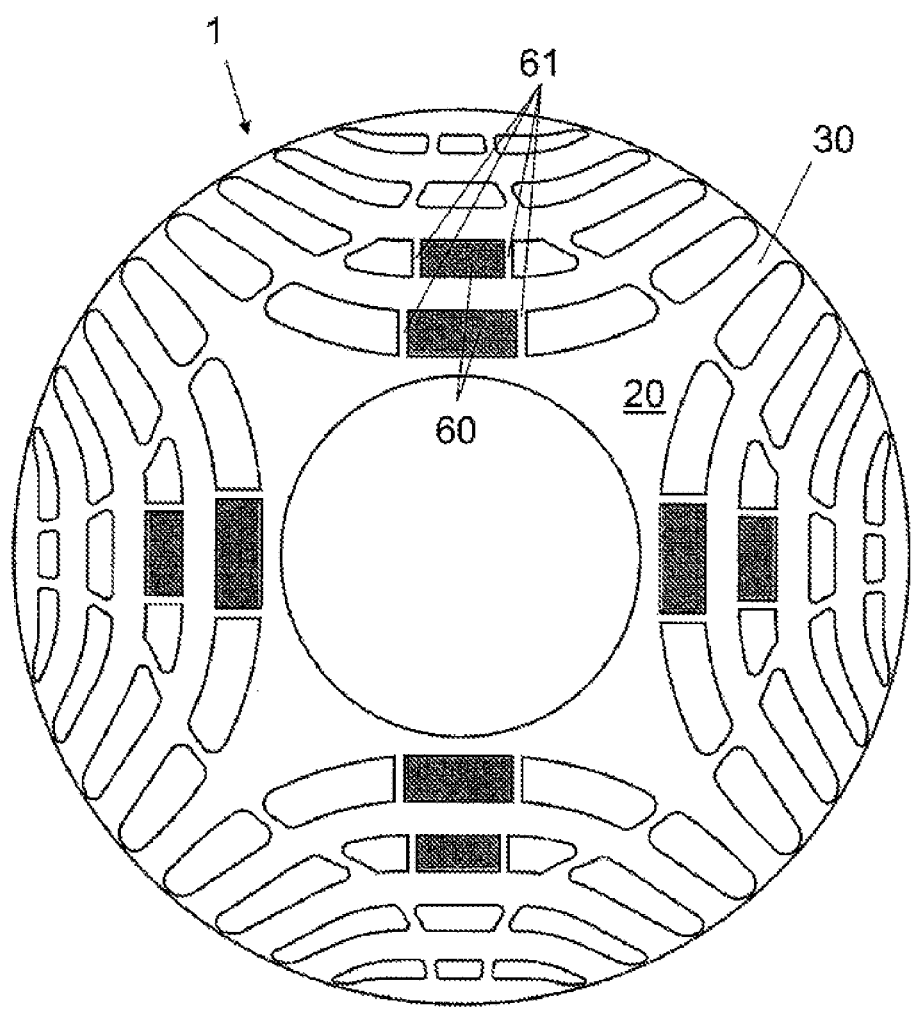

FIG. 5 shows a rotor lamination 1, in which some of the inner flux barriers are divided by additional webs 61 and are thus filled in part with permanent magnets or permanent-magnetic filler material 60.

Figure 6:
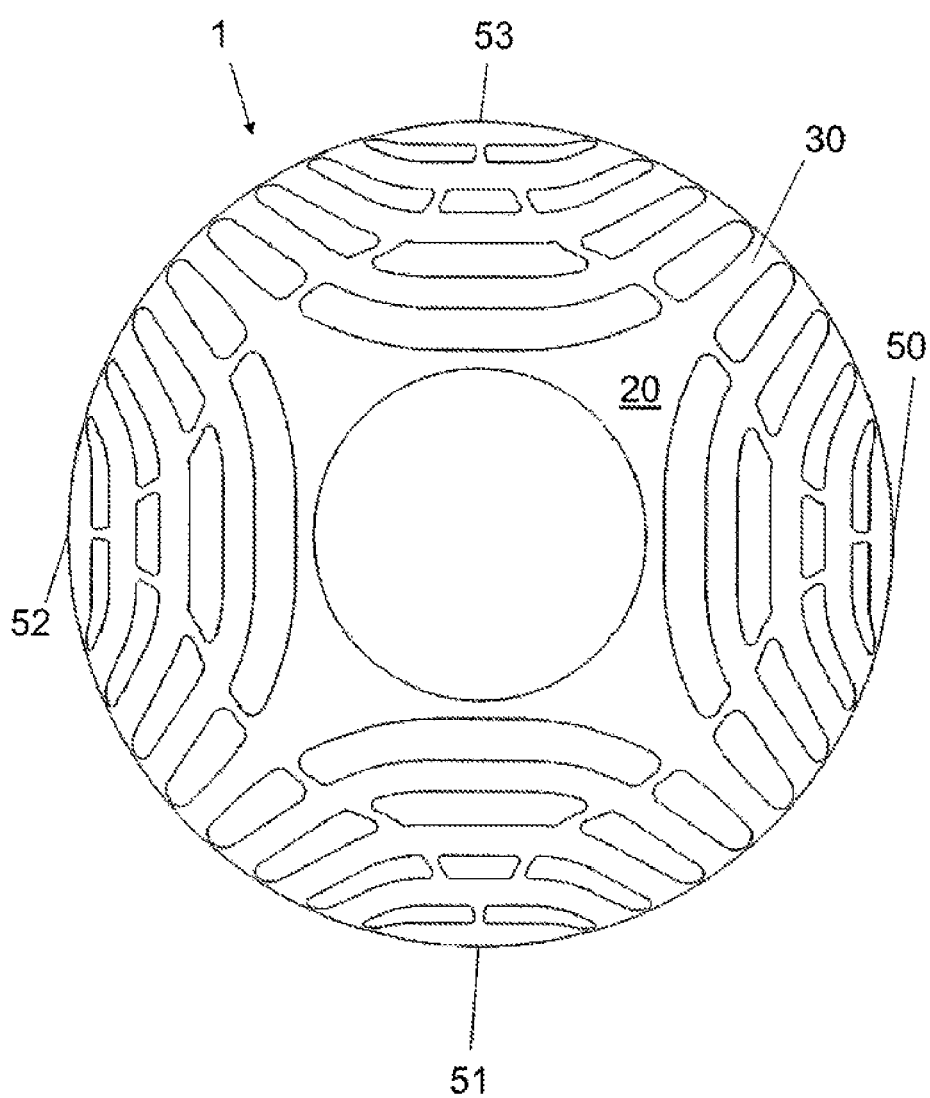
FIG. 6 shows a rotor lamination of the rotor according to the invention in accordance with a further embodiment.

FIG. 6 shows a rotor lamination 1 similar to that according to FIG. 3, wherein the flux barriers placed at the rotor periphery are each divided into two. In FIG. 6 the web guidance deviates at the points 50, 51, 52 and 53 from the conventional circle shape and extends as far as the outer periphery of the rotor lamination 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A rotor for a reluctance machine, comprising:
a cylindrical soft-magnetic element,
wherein
the soft-magnetic element has cutouts configured to form magnetic flux barriers,
the cutouts are arcuate and without discontinuous direction changes,
each of the cutouts has opposite ends adjacent to an outer circumference of the rotor,
at least a portion of the flux barriers are divided by one or more webs, the one or more webs being located in respective flux barriers of the portion of flux barriers along a line of curvature of each of the respective flux barriers, between the opposite ends of each of the respective flux barriers,
a course of the webs located in the respective flux barriers of the portion of flux barriers forms a closed line which divides the rotor in a radial direction into an inner rotor region and an outer rotor region,
the cutouts contain one or more of air and a paramagnetic or diamagnetic material,
the cutouts associated with each q-axis of the rotor are symmetric relative to their respective q-axis and concave in a direction facing away from a rotation axis of the rotor, and
the cutout ends are distributed about the entire outer circumference of the rotor.

2. The rotor as claimed in claim 1, wherein
the course of the webs and the flux barriers in the outer rotor region are formed such that the outer rotor region is configured as at least a portion of a starting cage.

3. The rotor as claimed in claim 1, wherein
continuous flux barrier segments are not trans-regional.

4. The rotor as claimed in claim 1, wherein
the webs are not or are only partially oriented in the radial direction.

5. The rotor as claimed in claim 1, wherein
the course of the webs divides the inner and outer rotor region into one of annular inner and outer rotor regions, rectangular inner and outer regions, and quadrangular inner and an outer regions.

6. The rotor as claimed in claim 1, wherein
the inner region borders the rotor periphery in portions.

7. The rotor as claimed in claim 1, wherein
the rotor has an even number of poles.

8. The rotor as claimed in claim 1, wherein
one or more flux barriers are filled at least in part with a paramagnetic or diamagnetic filler material.

9. The rotor as claimed in claim 8, wherein
the filler material comprises at least one of a metal oxide, aluminum, an aluminum alloy, copper, a copper alloy, plastic, ceramic, textile and wood.

10. The rotor as claimed in claim 8, wherein
the filler material is introduced into the flux barriers by casting or as a solid material.

11. The rotor as claimed in claim 8, wherein
the flux barriers of the inner and outer region are filled with different filler materials.

12. The rotor as claimed in claim 8, wherein
the flux barriers of the outer rotor region are filled at least in part with aluminum or an aluminum alloy.

13. The rotor as claimed in claim 1, wherein
at least one short-circuit ring is arranged on an end face of the rotor and forms a short circuit of at least two of the flux barriers in the outer rotor region.

14. A synchronous reluctance motor, comprising:
at least one rotor as claimed in claim 1,
wherein the synchronous reluctance motor does not include a frequency converter.

15. A method for producing a rotor as claimed in claim 1, comprising the act of:
casting a paramagnetic or diamagnetic medium to at least partially fill at least one of the flux barriers,
wherein during the casting step the rotor is subjected to an axial force in at least one of the rotor regions not being filled during the casting step.

16. The method as claimed in claim 15, wherein
the axial force is applied by a clamping tool having a bearing surface corresponding to a geometric dimensioning of the at least one of the rotor regions not being filled.

* * * * *